(12) United States Patent
Larroche

(10) Patent No.: US 6,468,619 B1
(45) Date of Patent: Oct. 22, 2002

(54) OPTICAL STORAGE MEDIA HAVING LIMITED USEFUL LIFE

(76) Inventor: Patrick Larroche, 333 Central Park West (Suite 110), New York, NY (US) 10025

( * ) Notice: Subject to any disclaimer, the term of this patent is extended or adjusted under 35 U.S.C. 154(b) by 21 days.

(21) Appl. No.: 09/699,903

(22) Filed: Oct. 30, 2000

Related U.S. Application Data

(63) Continuation-in-part of application No. 09/436,538, filed on Nov. 9, 1999, now abandoned.

(51) Int. Cl.$^7$ ................................................. B32B 3/02
(52) U.S. Cl. ................. 428/64.1; 428/64.4; 430/270.12
(58) Field of Search ............................... 428/64.1, 64.4, 428/457, 913; 430/270.11, 270.12, 495.1, 945; 369/283, 288

(56) References Cited

U.S. PATENT DOCUMENTS

| | | | |
|---|---|---|---|
| 3,688,708 A | 9/1972 | Meyerhoefer | 109/29 |
| 4,371,954 A | 2/1983 | Cornet | 365/126 |
| 4,635,245 A | 1/1987 | Smith | 369/275 |
| 4,637,008 A | 1/1987 | Eden | 369/100 |
| 4,639,813 A | 1/1987 | Uno | 360/128 |
| 4,737,934 A | 4/1988 | Ross et al. | 365/106 |
| 4,818,666 A | 4/1989 | Gravesteijn et al. | 430/495 |
| 4,931,770 A | 6/1990 | Abramson | 340/541 |
| 5,056,081 A | 10/1991 | Hsieh | 369/100 |
| 5,625,524 A | 4/1997 | Konagaya et al. | 365/127 |
| 5,840,466 A | 11/1998 | Nonaka et al. | 430/270.13 |
| 6,011,772 A * | 1/2000 | Rollhaus | 369/286 |

FOREIGN PATENT DOCUMENTS

| | | |
|---|---|---|
| DE | 198 57 772 | 6/2000 |
| EP | 0208118 A2 | 7/1985 |
| WO | WO 98/11539 | 3/1998 |

* cited by examiner

*Primary Examiner*—Elizabeth Mulvaney
(74) *Attorney, Agent, or Firm*—Drinker Biddle & Reath LLP

(57) ABSTRACT

Optical storage media with limited useful life include a substrate having a data storage portion containing readable data. A reservoir associated with the substrate releasably retains a preselected chemical agent that interacts with the data storage portion to render it unreadable a preselected period of time after the chemical agent is released. Alternatively, the invention includes an optical storage medium including a substrate supporting a metallic data storage layer for storing optically readable data, a reservoir located in proximity to the data storage layer for storing a chemical agent in contact with the data storage layer on a first side of the reservoir, and a flexible metallic lamina in contact with the chemical agent on an opposite side of the reservoir. A nonconductive member is located intermediate the data storage layer and the lamina for holding apart the data storage layer and the lamina, and has at least a portion through which the lamina can be deformed and come into contact with the data storage layer to complete a voltaic circuit from the data storage layer through the chemical agent to the lamina. Opening the storage container releases the chemical agent or completes the voltaic circuit, and starts the interaction with the optical storage medium, which will become unreadable after a preselected period of time.

19 Claims, 7 Drawing Sheets

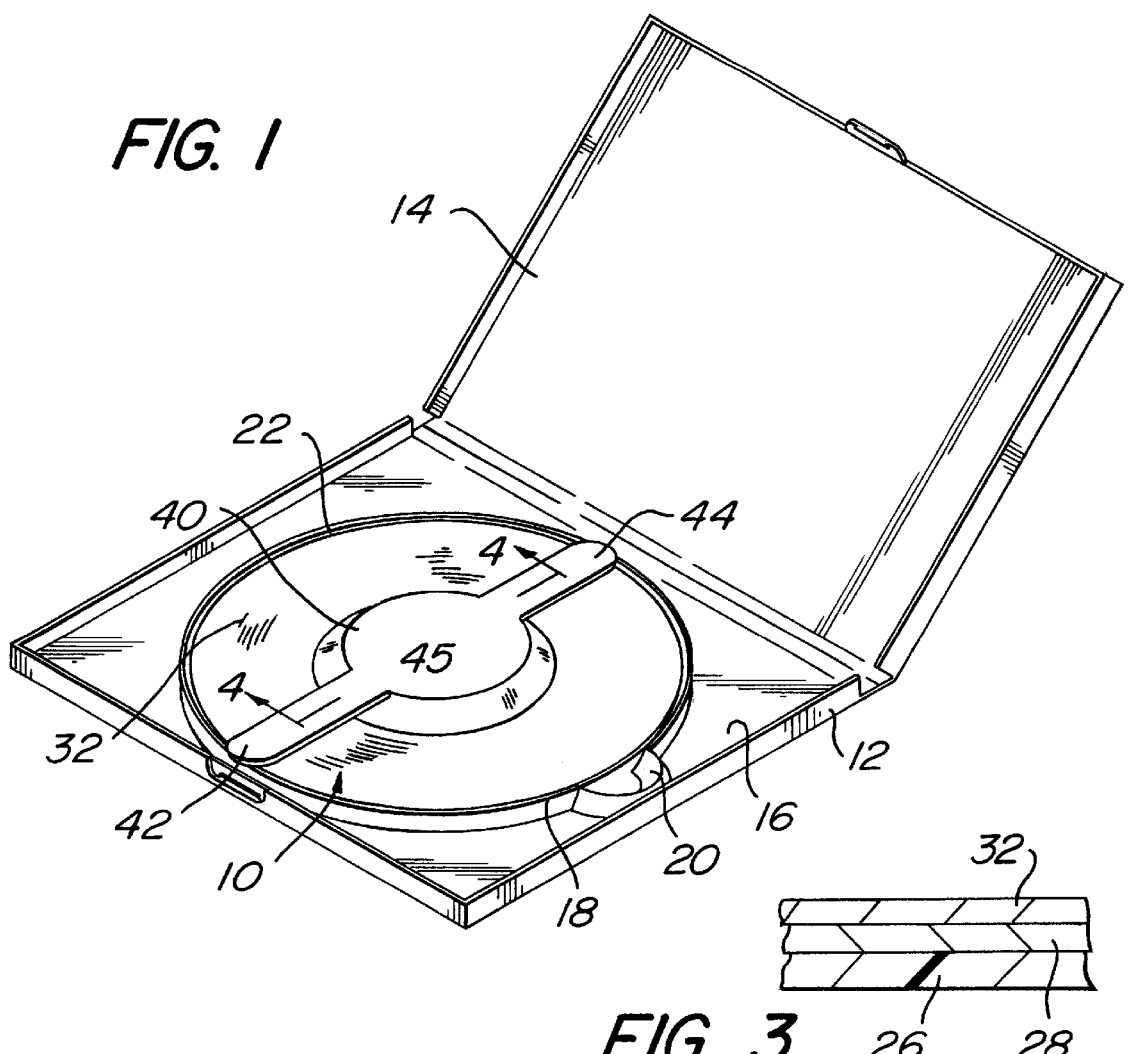
FIG. 1
FIG. 3
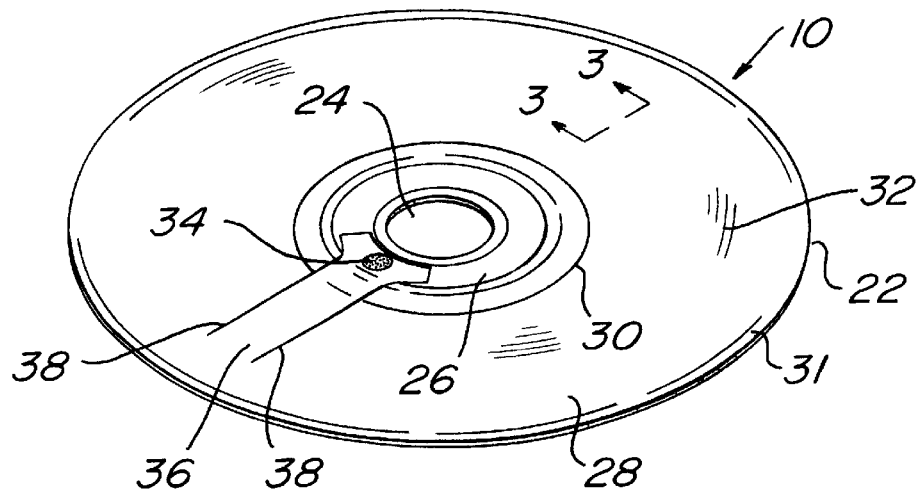
FIG. 2

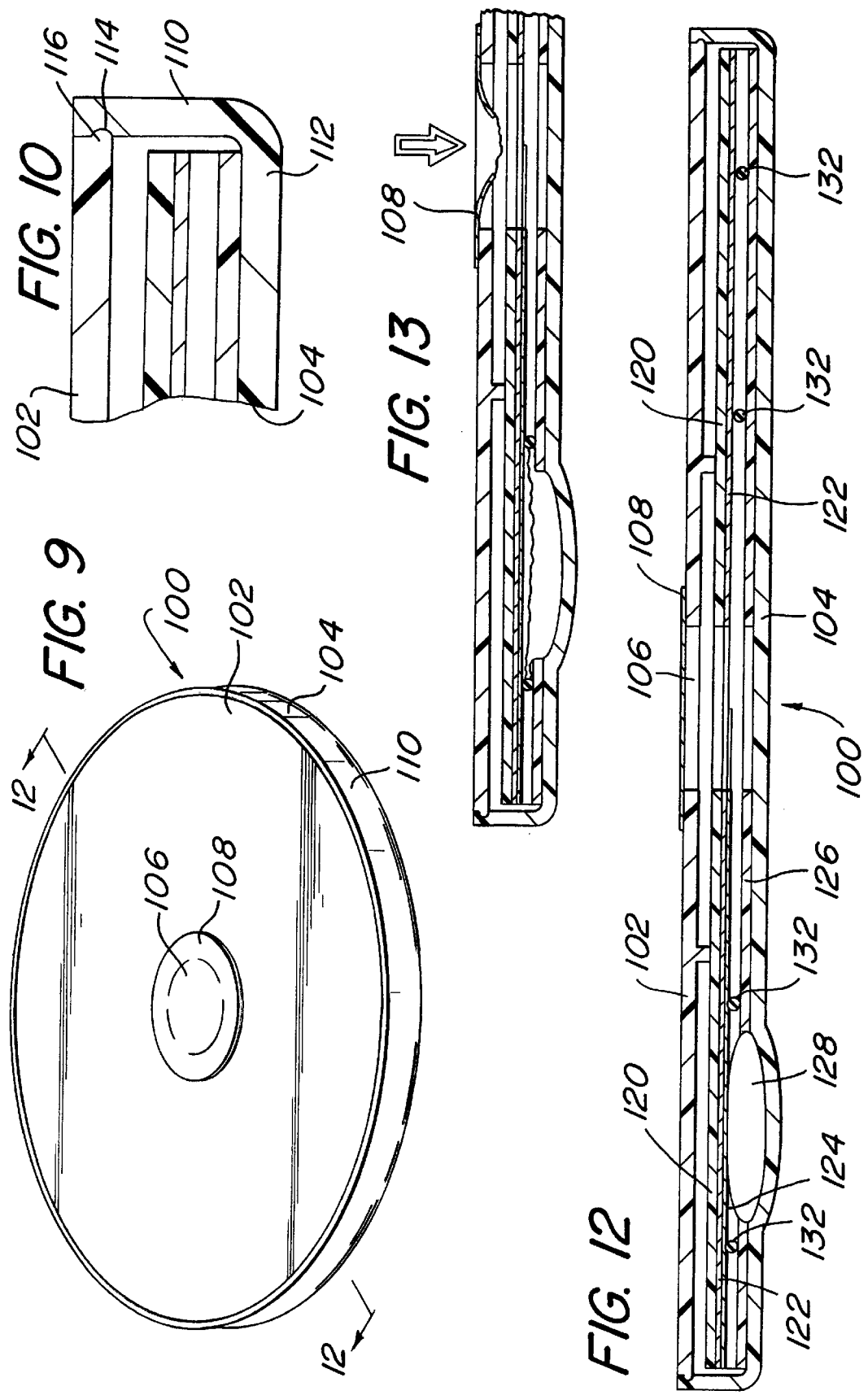

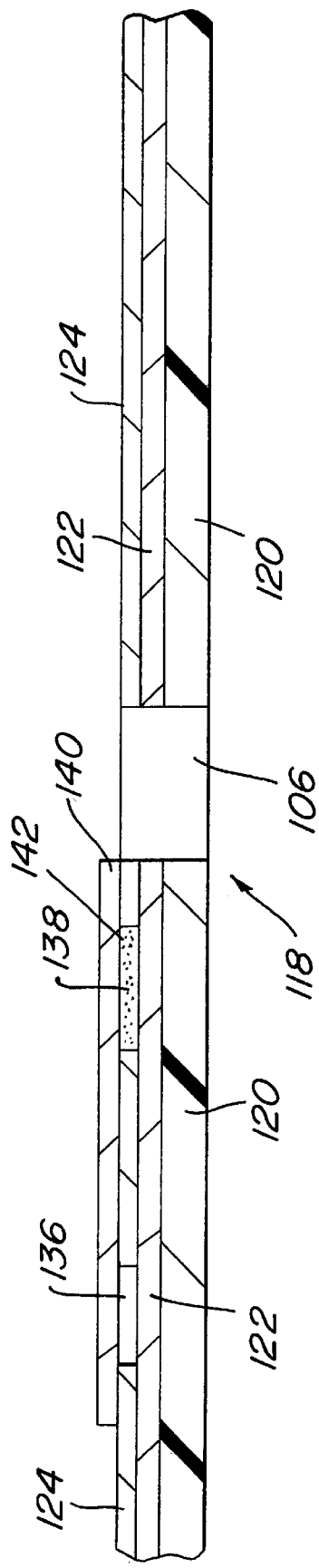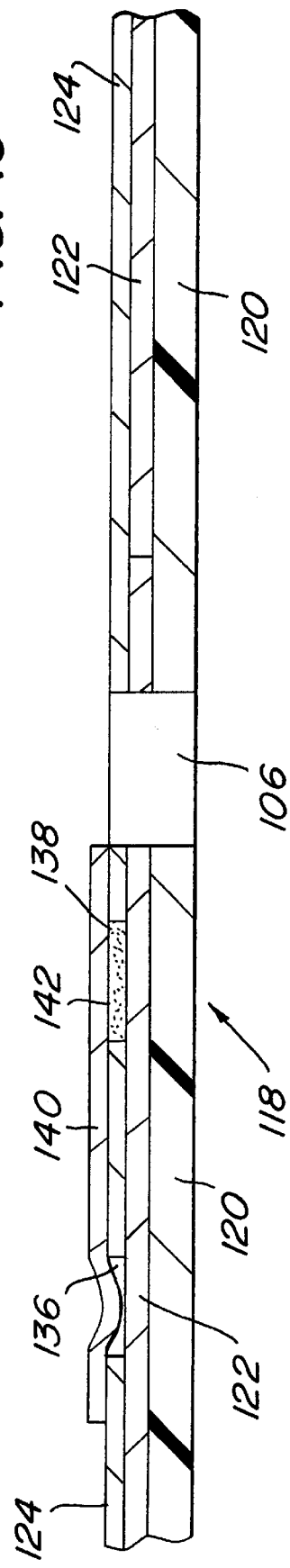

OPTICAL STORAGE MEDIA HAVING LIMITED USEFUL LIFE

CROSS-REFERENCE TO RELATED APPLICATION

This application is a continuation-in-part of application Ser. No. 09/436,538, filed Nov. 9, 1999, now abandoned by the same inventor.

FIELD OF THE INVENTION

The present invention relates to optical storage media. In particular, the present invention relates to an optical storage medium including an agent that renders the optical storage medium unreadable after a preselected period of time.

BACKGROUND OF THE INVENTION

Optical storage media are well known in the art. Optical storage media, such as audio and/or visual compact discs (CD) or digital versatile discs (DVD), permit large amounts of data or information to be stored and retrieved. Because of their capacity to store large amounts of data, optical storage media have become enormously popular in the content media industry for delivering computer software, compilations of music, movies, and other types of audio and/or visual materials to the consumer.

Typically, data stored in an optical storage medium remains available to the consumer without any practical limit as to the length of time over which the data may be read. Being most of the time read only memory, there are no software limitations introduced in the data to otherwise prevent or limit the availability or readability of the data. However, the absence of any limit to the availability or readability of the data is a drawback in some cases.

A significant factor contributing to the price charged for an optical storage medium is the useful life of the data stored thereon. Because the data remains available for the life of the particular optical storage medium, the data may be repeatedly copied by the consumer without remitting any payment to the content media distributor or royalties to the author of the work or data. As a result, significant monies may be lost due to the length of time over which the data is available. Although the risk that the data may be repeatedly copied is typically passed on to the consumer in the form of higher prices for the sale or rental of the optical storage medium, the higher prices do little to curtail copying. However, by controlling the useful life or the availability of the data, there is the potential to create a new revenue stream in repeat purchases (similar to rentals) of optical storage media.

Accordingly, it is desirable to provide an optical storage medium having limited useful life. In particular, it is desired to provide an optical storage medium to control the period over which the data stored in the optical storage medium becomes unreadable.

SUMMARY OF THE INVENTION

In a preferred embodiment, the invention comprises an optical storage medium comprising a substrate supporting a data storage layer for storing optically readable data. A reservoir is attached to the substrate for storing a chemical agent. The reservoir is rupturable to release the chemical agent when subjected to an applied force. The reservoir is located in proximity to the data storage layer to permit the chemical agent released from the reservoir upon rupture to contact the data storage layer.

In a narrower aspect of the invention, the invention comprises an optical storage medium as described above, and a substantially airtight container having an interior in which the substrate and attached reservoir are housed. The interior of the container is under a vacuum. The container includes a lid having an opening sealed by a frangible seal for admitting air under atmospheric pressure into the interior when the frangible seal is broken. The atmospheric pressure exerts a force on the reservoir sufficient to rupture the reservoir and release the chemical agent.

In a different aspect of the invention, the invention comprises an optical storage medium including a substrate supporting a metallic data storage layer for storing optically readable data, a reservoir located in proximity to the data storage layer for storing a chemical agent in contact with the data storage layer on a first side of the reservoir, and a flexible metallic lamina in contact with the chemical agent on an opposite side of the reservoir. The lamina is more electronegative than the data storage layer. A nonconductive member is located intermediate the data storage layer and the lamina for holding apart the data storage layer and the lamina. The nonconductive member has at least a portion through which the lamina can be deformed and come into contact with the data storage layer to complete a voltaic circuit from the data storage layer through the chemical agent to the lamina. As a result, the material of the data storage layer will degrade over time due to voltaic action.

BRIEF DESCRIPTIONS OF THE DRAWINGS

For purposes of illustrating the invention, there is shown in the drawings forms of the invention which are presently preferred; it being understood, however, that this invention is not limited to the precise arrangements and instrumentalities shown.

FIG. 1 is a perspective view of an optical storage medium of the present invention removably stored in a case.

FIG. 2 is a perspective view of the optical storage medium shown in FIG. 1, removed from the case.

FIG. 3 is a detailed section view of a portion of the optical storage medium shown in FIG. 2, taken along line 3—3.

FIG. 9 is an isometric view of a fourth embodiment of an optical storage medium of the present invention in an unopened vacuum sealed case.

FIG. 10 is a partial sectional view, on an enlarged scale, of a portion of the edge of the case illustrated in FIG. 9.

FIG. 12 is an enlarged cross sectional view of the optical storage medium stored in the unopened vacuum sealed case shown in FIG. 9, take along the line 12—12 in FIG. 9.

FIG. 13 is an enlarged cross sectional view of a portion of the optical storage medium as shown in FIG. 12, the case having been unsealed and subjected to atmospheric pressure prior to opening.

FIG. 14 is an enlarged cross sectional view, partially broken away, of a fifth embodiment of an optical storage medium of the present invention, shown apart from an unopened vacuum sealed case, but shown as it would be in the vacuum sealed case.

FIG. 15 is an enlarged cross sectional view, partially broken away, of the embodiment of an optical storage medium shown in FIG. 14, also shown apart from an unopened vacuum sealed case, but shown as it would be after the vacuum sealed case has been opened.

DETAILED DESCRIPTION OF THE INVENTION

Figure 4:
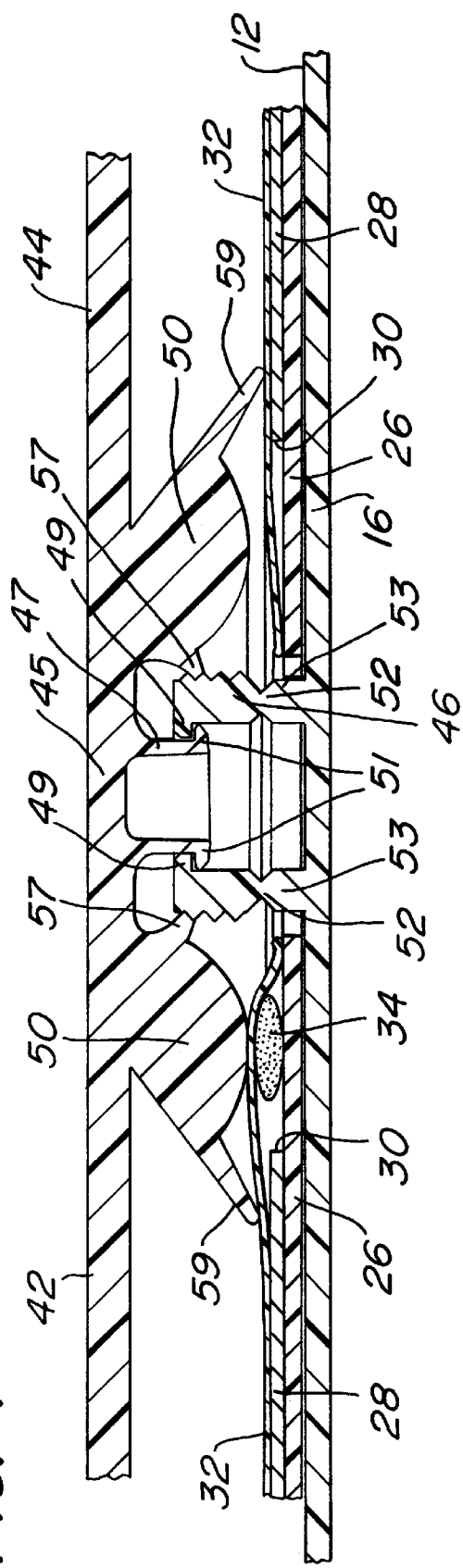
FIG. 4 is an enlarged cross sectional view of the optical storage medium and case shown in FIG. 1, taken along line 4—4.

In the drawings, where like numerals identify like elements, there is shown an embodiment of an optical storage medium 10 of the present invention. The optical storage medium 10 is a storage device in which data or other types of information may be stored and read, such as an audio and/or video compact disc (CD), a digital versatile disc (DVD), and the like. The optical storage medium 10 described herein is preferably a CD or DVD).

FIG. 1 shows the optical storage medium 10 in an environment presently known in the art, namely, removably stored within a case or storage container 12. The case 12 includes a base 16 having a storage housing 18 that is shaped and dimensioned to receive the optical storage medium 10. A recess 20 in communication with the storage housing 18 provides a finger or thumb receiving portion of the base 16 so that the optical storage medium 10 may be grasped for easy removal. The base 16 is pivotably joined to a lid 14 by a living hinge. The lid 14 rotates about the hinge to enclose the optical storage medium 10 within the case 12. The case 12 shown in FIG. 1 is merely exemplary of the type of CD or DVD cases presently known in the art and is not critical to the invention. Therefore, it is contemplated that the optical storage medium 10 of the present invention may be utilized and sold independent of the case 12.

Turning now to FIG. 2, the optical storage medium 10 is shown in isolation, after having been removed from the case 12, for example. The optical storage medium 10 is circular, having an edge 22 that defines an outer periphery. The optical storage medium 10 includes a rigid substrate 26, as shown in FIGS. 2 and 3. The substrate 26 includes a central aperture or opening 24 and is made of transparent material, such as glass or plastic. Preferably, the substrate 26 is made of transparent polycarbonate plastic having a first or top surface 25 and a second or bottom surface 27. The top and bottom surfaces 25 and 27 are spaced apart from each other by the thickness of the substrate 26, as best seen in FIG. 3.

The substrate 26 includes a data storage portion associated therewith on one surface, usually the bottom. The data storage portion includes readable data or information represented by pits or bumps formed within one or more radial tracks of the substrate 26 that are scanned by a laser to read the data. The data storage portion has a leading edge that is radially outward of the aperture 24, but inward of the edge 22.

The data storage portion has been described as being formed within the substrate 26. However, other embodiments are contemplated. For example, it is contemplated that the data storage portion may be a separate layer of recordable and/or readable material that is supported by the substrate 26. In this way, the substrate 26 will provide support for the recording layer that provides the primary source of the readable data stored on the optical storage medium 10. Other suitable structures may be used.

As best seen in FIG. 3, a relatively thin reflective layer 28 overlies the substrate 26. The reflective layer 28 provides a necessary reflective surface for the output of a laser so that the data stored on the optical storage medium 10 may be read. The reflective layer 28 is disposed on the top 25 surface of the substrate 26, having an inner edge 30 positioned radially outward of the aperture 24 and an outer edge 31 that is radially inward of edge 22. Preferably, the reflective layer 28 is a thin sheet of reflective metallic material, such as aluminum.

A reservoir or cavity 34 is associated with the substrate 26, as shown in FIG. 2. The reservoir 34 is provided to releasably retain a preselected chemical agent that will render the optical storage medium 10 unreadable after a preselected period of time, as discussed in more detail below. The reservoir 34 is in communication with the reflective layer 28 or data storage portion of the substrate 26 and as shown in FIG. 2, is located intermediate aperture 24 and edge 30. The reservoir 34 may be formed by a recess or well formed within the substrate 26. Preferably, the reservoir 34 is a capsule that sits within the recess or on the top surface 25 of the substrate 26. The capsule has a relatively thin shell and releasably retains the preselected chemical agent. It should be understood that the location of the reservoir 34 shown in FIG. 2 is merely exemplary, and may be located anywhere on or within the optical storage medium 10 to releasably retain the chemical agent.

The chemical agent interacts with the optical storage medium 10 to render it unreadable after a preselected period of time by disrupting the ability of the laser to read the data stored in substrate 26. The chemical agent reacts with or dissolves the metallic material of reflective layer 28 so that the laser cannot read select portions of the data. Those of ordinary skill in the art will appreciate that aluminum has relatively low reactivity in that, due to its characteristics, it is instantly protected by a cover of oxide at any time. Despite this low reactivity, aluminum is known to react to certain chemicals under certain conditions and circumstances when the aluminum oxide is dissolved by a chemical agent that can, because of the dissolution of the oxide, react with the aluminum. For example, aluminum is sensitive to bases such as NaOH or KOH, acids such as HCl, $H_2SO_4$, $NHO_3$, and several metallic salts, such as $CuSO_4$, as a few examples.

The properties of these chemical agents may be advantageously used to facilitate and control the rate of dissolution or corrosion of the aluminum. For example, the corrosion of an aluminum reflective layer 28 may be steady and uniform with certain agents, such as NaOH or HCl, or may become pitted upon exposure to agents such as $CuSO_4$. In particular, a solution of NaOH with a concentration of 0.06 g/l and a pH of 11 generates a rate of dissolution of the aluminum reflective layer 28 ranging anywhere between approximately 0.3 micron per hour and approximately 1.0 micron per hour. Inhibitors like soda silicate can reduce or delay the action of NaOH, thereby reducing the rate of dissolution of the aluminum of the reflective layer 28, but extending the period over which the data will become unreadable.

As an additional example, a solution of HCl with a concentration of 5.0% produces a rate of dissolution of the aluminum of the reflective layer 28 ranging anywhere between approximately 1.0 microns per 24 hours and approximately 3.0 microns per 24 hours. Inhibitors can reduce or delay the effects of the HCl even further, thereby reducing the rate of dissolution, but extending the period over which the data will be readable.

As yet another example, a solution of $CuSO_4$ with a concentration of 1.0% produces a rate of dissolution of the aluminum of the reflective layer 28 ranging anywhere between approximately 1.0 microns per 24 hours to approximately 2.0 microns per 24 hours.

Those of ordinary skill will appreciate that the dissolution of the aluminum, and the period after which the optical storage medium 10 will become unreadable, will depend on many factors. Those factors include the thickness of the aluminum and the characteristics of the chemical agent. For example, the relative thickness of the aluminum may be selectably adjusted to control the time needed by the chemical agent to at least partially dissolve the aluminum sufficiently to reach the polycarbonate layer or substrate 26 so as to destroy the availability of the data. The chemical properties of the chemical agent may also be selectably adjusted to control the period over which the data of a particular optical storage medium 10 will become unreadable. Another factor is the type of metallic material used for the reflective layer 28. Although aluminum is presently preferred, other types of metallic material having properties similar to aluminum may be used with the optical storage medium 10. Therefore, the type of metallic material used for the reflective layer 28 should be taken into account to determine the type, concentration, and amount of the chemical agent needed.

A supply path 36 is provided on one side of the reflective layer 28 to control the distribution or flow of the chemical agent. As shown in FIG. 2, the supply path 36 is in fluid communication with the reservoir 34 and is defined by borders or guides 38 that extends around the reservoir 34 and have an end that terminates radially inward of the edge 31 of the reflective layer 28. The borders 38 direct the flow of the chemical agent to the select portions of the reflective layer 28 when the chemical agent is released. Preferably, each border 38 is a thin bead of material, such as glue, on the top surface of the reflective layer 28 so that they will not interfere with the reading of the data.

Preferably, as shown in FIGS. 2 and 3, a protective layer of material 32 is provided to prevent the spread of the chemical agent external to the optical storage medium 10 when released. The protective layer 32 is disposed over the reflective layer 28, and has an outer edge secured to the edge 22 of the substrate 26. The protective layer 32 may be made of plastic or other suitable material, such as an acrylic. The protective layer 32 is vacuum sealed to the substrate 26 to encapsulate the reservoir 34 and chemical agent in an airtight and liquid tight environment. In this way, the protective layer 32 enables the optical storage medium 10 to have the capacity to store in airtight conditions gases such as hydrogen that are generated by the chemical reaction between the chemical agent and the reflective layer 28. Once the protective layer 32 is sealed to the substrate 26, the chemical agent in the reservoir 34 will be stable until released.

It is contemplated that the protective layer 32 described above may be transparent or opaque. It is also contemplated that the exposed surface of the protective layer 32 may have applied thereon graphic or alphanumeric indicia, advertising material, labels, and the like.

The storage medium is held in place in case 12 by a retainer which also functions as a chemical reaction starting device 40 to selectably control the release of the chemical agent when the retainer is removed to permit removal of the storage medium. As shown in FIG. 1, the starting device 40 is removably joined or secured to the optical storage medium 10 to prevent the optical storage medium 10 from being used until it is removed and the chemical agent released. As shown in FIG. 1, the starting device includes a pair of rigid members or arms, a first 42 and a second 44, that extend radially outward from a central portion or bridge 45. Each rigid member 42 or 44 forms a handle so that the user may operate or remove the starting device 40, as discussed below.

As best seen in FIG. 4, the starting device 40 is joined to the case by a screw 46. The screw 46 has an outer surface that is threaded and a hollow center. The center of the screw 46 includes an annular flange 49 that extends radially inwardly of the outer surface. The flange 49 has an inner edge that defines a hole that provides access to the hollow center of the screw 46. The flange 49 is provided to engage a locking collar 47 that extends downwardly from the bridge 45. The locking collar 47 includes a cylindrical body having an outer diameter that is slightly smaller than the hole formed by the flange 49. An annular flange or detent mechanism 51 extends radially outwardly from the distal end of the body of the collar 47, and is provided to snap-fit into the hollow portion of the screw 46. The bottom edge of the flange 51 is beveled to facilitate insertion of the locking collar 47 into the screw 46.

As shown in FIG. 4, the screw 46 terminates in a frangible portion 52 that is releasably joined to a hub 53. The hub 53 projects upwardly from the base 16 and is preferably cylindrical, having an outer surface with a diameter that is the same or slightly shorter than the central aperture 24 of the optical storage medium 10. The upper portion of the hub 53 is joined to the bottom portion of the screw 46 at a portion of reduced wall thickness to define the frangible portion 52. The frangible portion 52 is provided so that the starting device 40 and screw 46 may be removed from the optical storage medium 10.

The bridge 45 supports a heel or projection member 50. The heel 50 projects downwardly from the rigid members 42 and 44 and includes a lower surface that sits over or lightly contacts the portion of the protective layer 32 that is positioned over the reservoir 34. Preferably, the heel 50 extends radially and continuously around the screw 46 so that the lower portion will be in constant contact with the reservoir 34 no matter how the optical storage medium 10 is placed in the case 10. The heel 50 includes a drive 57 and a finger 59. The drive 57 extends around the inner portion of the heel 50 and engages the threads of the screw 46. The finger 59 extends downwardly at an angle relative to the rigid members 42 and 44, terminating at an end that lightly contacts the surface of the protective layer 32. The finger 59 conceals the screw 46 and prevents objects from getting underneath the heel 50.

To assemble the case 12 as shown in FIGS. 1 and 4, the optical storage medium 10 is seated within the housing 18 of the case 12, such that the screw 46 projects though the central aperture 24. Once the storage medium 10 is positioned within the housing 18, the starting device 40 is joined. The starting device 40 is joined by inserting the locking collar 47 into the hole of the screw 46. The annular flange 51 of the locking collar 47 will engage the flange of 49 the screw 46 until its snaps in place such that the upper surface of the flange 51 of the locking collar 47 engages the lower surface of the flange 49 of the screw 46, as illustrated in FIG. 4. In this way, the starting device 46 cannot be easily removed from the screw 46 by simply pulling it upwardly. As a result, the starting device 40 prevents the optical storage medium 10 from being used until the starting device 40 is removed. Once the starting device 40 is in place, a portion of the heel 50 will be positioned over the reservoir 34, as shown.

In operation, to use the optical storage medium 10, the starting device 40 must be removed. To remove the starting device 40, the rigid members 42 are rotated about the screw 46. As the rigid members 42 and 44 are rotated, the drive 57 will follow the grooves of the thread, moving generally downwardly toward the base 16. As the drive 57 moves downwardly the heel 50 will exert a downwardly directed force or pressure on the reservoir 34 or capsule. The pressure exerted on the reservoir 34 facilitates or causes the release of the chemical agent, which then flows onto the preselected portion of the reflective layer 28 through the supply path 36, thereby starting the interaction between the chemical agent and optical storage medium 10. After a preselected period of time, the chemical agent will dissolve the reflective layer 28 to render the optical storage medium 10 unreadable, after which it has to be discarded. The dissolution of the reflective layer 28 can be observed by the consumer, indicating that the optical storage medium is unreadable.

As the rigid members 42 and 44 are further rotated, pressure will be created about the frangible portion 52 such that the screw 46 breaks off from the hub 53. Once the screw 46 breaks off, both the screw 46 and rigid members 42 and 44 are removed and the optical storage medium 10 may be removed from the housing 18. The hub 53 can then be used in conventional fashion for removably securing the optical storage medium 10 in the case 12.

In an alternative embodiment, the rigid members 42 and 44 may be joined by screw 46 disposed within a hole or channel formed within the hub 53 of the case 12. When the screw 46 is tightened to a preselected level of tension, the screw 46 will break apart so that the rigid members 42 and 44 may be removed from the case 12. Tightening screw 46 will also cause the head of the screw 46 to move downwardly toward the base 18, taking with it the drive 57 of the heel 50. As the drive 57 moves downwardly toward the base 18, the heel 50 will exert sufficient pressure on the reservoir 34 or capsule to release the chemical agent.

The operation of the release of the chemical agent has been described by the use of the starting device 40 as shown in FIGS. 1 and 4. However other devices may be used. For example, the starting device 40 may be replaced by other types of mechanical devices or mechanisms, such as pressure release couplings, push-button devices, and other mechanical means.

Figure 5:
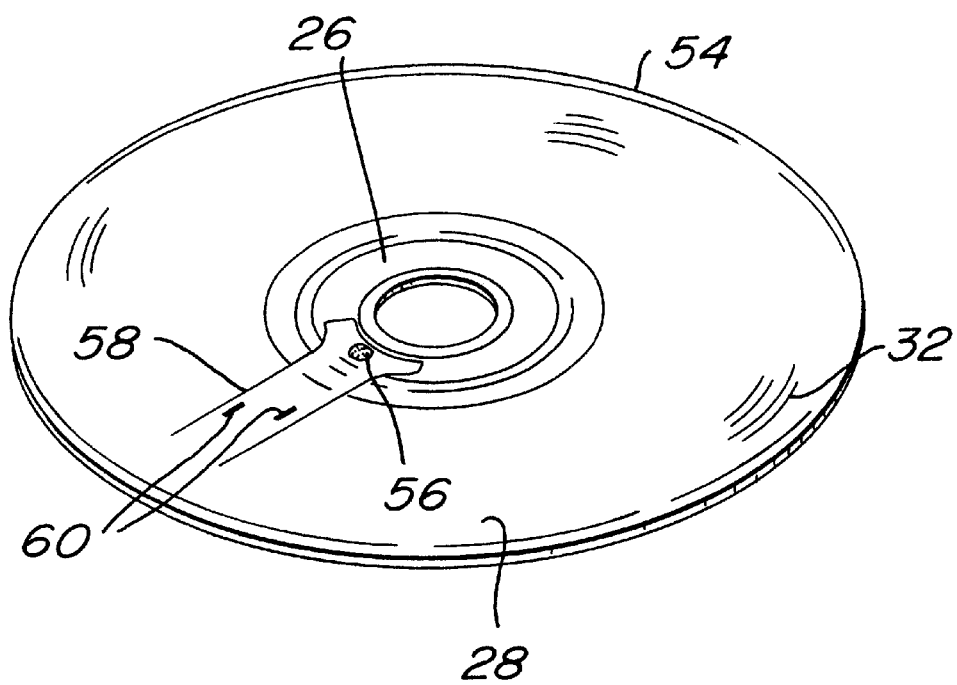
FIG. 5 is a perspective view of a second embodiment of an optical storage medium of the present invention.

FIG. 5 shows an alternative embodiment of an optical storage medium 54. The optical storage medium 54 shown in FIG. 5 is similar to the optical storage medium 10, described with reference to FIGS. 1–4 above. The optical storage medium 54 includes a substrate 26, a reflective layer 28, and a protective layer 32. A reservoir or capsule 56 is formed within the substrate 26, as described above, and is in communication with a supply path 58. The reservoir 56 is provided to releasably retain a preselected chemical agent in much the same way reservoir 34 releasably retains the chemical agent described with reference to the optical storage medium 10 of FIGS. 1–4. The chemical agent is provided to render the optical storage medium 54 unreadable after a preselected period of time.

As shown in FIG. 5, the reflective layer 28 includes small segments or pieces of a metal or metallic material 60 (two shown), such as copper, iron or any suitable alloy. Preferably, the metal segments 60 are added to the surface of the reflective layer 28 that faces the protective layer 32. The segments 60 have an electrochemical potential different from the metallic material of the reflective layer 28. The chemical agent retained in the reservoir 56 to interact with the optical storage medium 54 is a solution having preselected electric conductivity with a pre-set level of concentration, such as NaCl. When the chemical agent is released, the chemical agent will flow onto select areas of the reflective layer 28 through supply path 58 toward the segments 60. Once the chemical agent contacts the two metals (i.e., the segment 60 and reflective layer 28), the chemical agent facilitates an electrochemical reaction which dissolves selected portions of the reflective layer 28. The dissolution of the reflective layer 28 will form pits in the area of contact with the segments 60, which, in turn, disrupts the ability of the laser to read the data of the substrate 26 after a preselected period of time. As a result, the optical storage medium 54 or the data stored in the data storage portion 30 will become unreadable, after which it must be discarded. The dissolution of the reflective layer 28 should be observable to the user.

It is contemplated that the type and thickness of the metal segments 60 and the type of chemical agent may be selectably adjusted to control the period over which the select portions of the reflective layer 28 will be dissolved. It is also contemplated that one or a series of segments 60 may be used, in keeping with the scope of the present invention.

Figure 8:
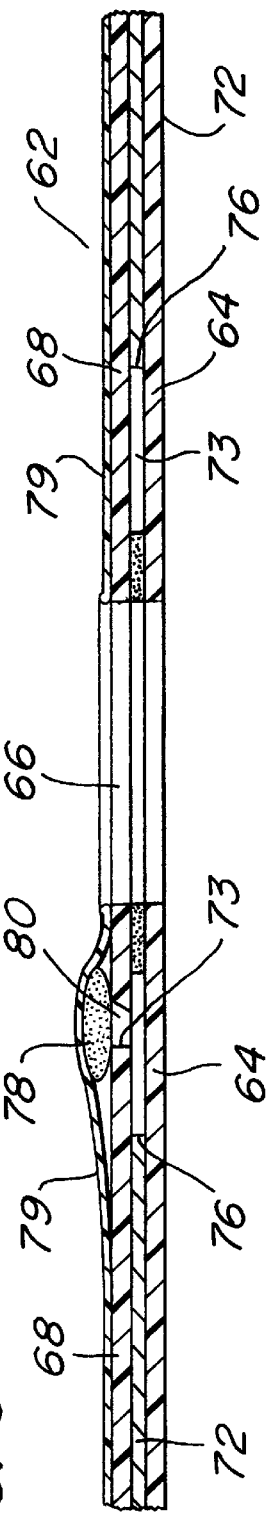
FIG. 8 is an enlarged cross sectional view of the optical storage medium shown in FIG. 6, taken along line 8—8.
Figure 6:
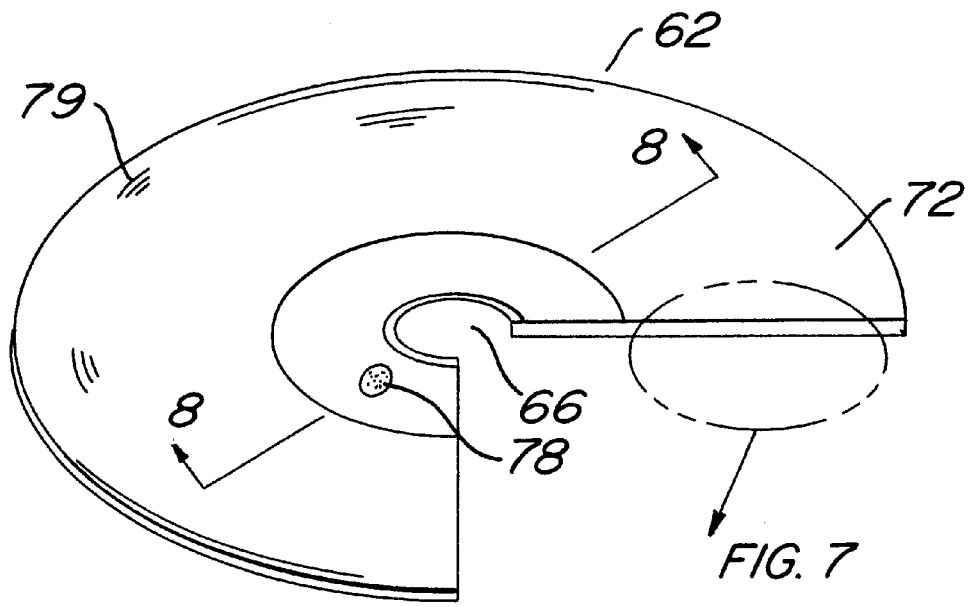
FIG. 6 is a partially cut away perspective view of a third embodiment of an optical storage medium of the present invention.
Figure 7:
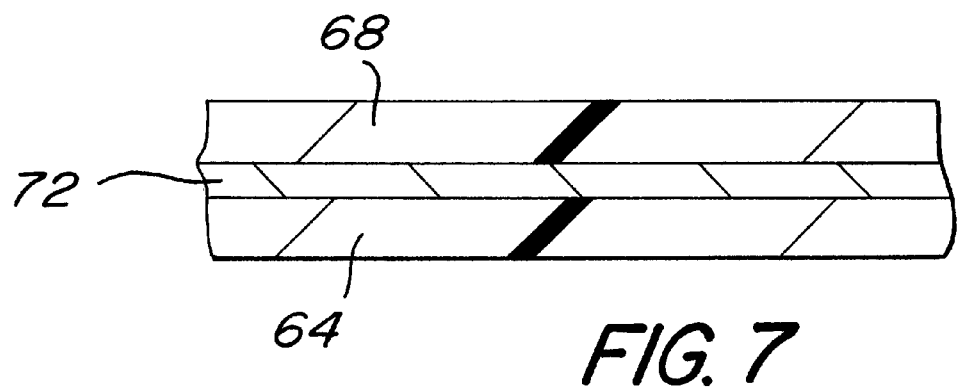
FIG. 7 is a view of a cross-section of the optical storage medium shown in FIG. 6.

FIGS. 6–8 show an alternative embodiment of an optical storage medium 62, which is in the form similar to a double sided DVD. As shown in FIGS. 6 and 7, the optical storage medium 62 includes a first substrate 64 and a second substrate 68. Both the first substrate 64 and second substrate 68 have a central hole or opening 66 and are made of transparent material, such as polycarbonate plastic, glass, ceramic, or the like. Each substrate 64 and 68 include a data storage portion for storing readable data (not shown) or include a separate layer of recording material to store the data.

A reflective layer 72 is provided intermediate substrates 64 and 68. The reflective layer 72 provides a reflective surface so that data stored on each exposed side of substrates 64 and 68 may be read. Preferably, the data is in the form of pits or bumps formed in radial tracks of the substrates 64 and 68 may be read by a laser. To read the data, the laser passes through the corresponding substrate 64 or 68 and is reflected from the reflective layer 72. Preferably, the reflective layer 72 is made of metallic material, such one or a pair of thin aluminum sheets that are bonded together, having an edge 76 that is radially inward of the hole 66, thereby creating a gap 73.

As shown in FIG. 6, a reservoir 78 is formed on one side of the optical storage medium 62. The reservoir 78 is provided to releasably retain a preselected chemical agent that is in communication with the data storage portion of the substrates 64 and 68. The chemical agent will render select portions of the data storage portion or reflective layer 72 unreadable after a preselected period of time when released. Preferably, the chemical agent is in the form of a capsule similar to that described with reference to reservoir 34 of optical storage medium 10, described with reference to FIGS. 1–4.

As best seen in FIG. 8, the reservoir 78 is in communication with a hole 80 that extends downwardly from the top of substrate 68. The hole 80 operates as a supply path and is in communication with the gap 73 that receives the chemical agent from the reservoir 78. The gap 73 is used as a means for directing the flow of the chemical agent onto the reflective layer 72 or data storage portion.

Preferably, a protective layer 79 will overlie the side of the optical storage medium 62 having the reservoir 78. The protective layer 79 is provided to encapsulate the reservoir 78 and its chemical agent in an airtight and liquid tight environment, in much the same way as the protective layer 32 described with reference to optical storage medium 10 creates an airtight and liquid tight environment, illustrated in FIGS. 1–4. As such, the release of the chemical agent will not flow outside of the optical storage medium 62.

The release of the chemical agent of reservoir 78 is selectably caused or controlled by a chemical reaction starting device (not shown) that operates in much the same way as the chemical reaction starting device 40 illustrated in FIGS. 1 and 4, and described above in reference to optical storage medium 10. The starting device is removably secured to the optical storage medium 62. The starting device prevents the optical storage medium 62 from being used until it is removed and the chemical agent is released.

The optical storage medium 62 is placed in a case, such as the type illustrated in FIGS. 1 and 4 described above. The starting device will prevent the optical storage medium 62 from being used until the starting device is removed. To use the optical storage medium 62, the rigid members of the starting device are rotated about the screw such that the heel will exert pressure on the reservoir 78. The pressure created on the reservoir 78 will cause the release of the chemical agent. When released, the chemical agent from the reservoir 78 will flow through the hole and enter the gap 73. Upon entering the gap 73, the chemical agent will contact preselected areas of the reflective layer 74 which will start the interaction with the optical storage medium 62. The chemical agent will then dissolve the reflective layer 72 after a preselected period of time. The dissolution of the reflective layer 72 will disrupt the ability of the data of each substrate 64 and 68 to be read by a laser. As a result, the optical storage medium 62 will become unreadable.

The operation of the optical storage medium 62 has been described using a preselected chemical agent stored in reservoir 78. However, it is contemplated that metal segments (not shown) may be provided on select portions of the reflective layer 72, having an electrochemical potential different than the metallic material used for the reflective layer 72. When the chemical agent is released an electrochemical reaction occurs between the two metals (i.e., the metal segment and the metallic material of the reflective layer 74) to form pits in the reflective layer 72, in much the same way as segments 60 dissolve reflective layer 28 of optical storage medium 54, described and illustrated in reference to FIG. 5.

The optical storage media 10, 54 and 62 of the present invention have been described and illustrated relative to a case 12, for purposes of discussion only. The case 12 is not critical to the invention. Indeed, it is contemplated that the embodiments of the optical storage media of the present invention may be sold and utilized independent of or without the case 12. The starting device may include or be removably coupled to a support element that would support a screw or similar type of member removably joined to the hub. In this way, the starting device would still prevent the optical storage medium from being used until the chemical agent is released. However, the optical storage media (with the starting device releasably attached thereto) may be offered for sale and sold independent of the case 12. This would help reduce costs associated with the sale of the optical storage media, which is particularly useful if the optical storage media are sold as one-time purchase items. Other embodiments of the starting device are contemplated which can be releasably secured to the optical storage media without a case.

FIGS. 9–13 show an alternative embodiment of the invention, in which the chemical agent is released not by mechanical action but by atmospheric pressure.

FIG. 9 illustrates a case or storage container 100 which holds an optical storage medium and a quantity of chemical agent in a reservoir. The case 100 has a lid 102 and a body 104, which is in the form of a shallow dish. Case 100 is illustrated as circular in shape, but may be square or rectangular, or any other shape, without departing from the scope of the invention. Both lid 102 and body 104 are made of an air-impermeable material, such as plastic. The lid 102 has an opening 106 in the center, shown in dashed lines in FIG. 9, sealed by a frangible seal 108. Seal 108 is preferably a thin metallic foil, and is also air-impermeable. As best seen in FIG. 10, body 104 has a circumferential side wall 110 which extends upward from a bottom 112. Side wall 110 has a groove 114 around the inner surface thereof which receives a complementary tongue 116 in lid 102. The tongue 116 and groove 114 are sized and shaped to form an air-tight seal between lid 102 and body 104.

Figure 11:
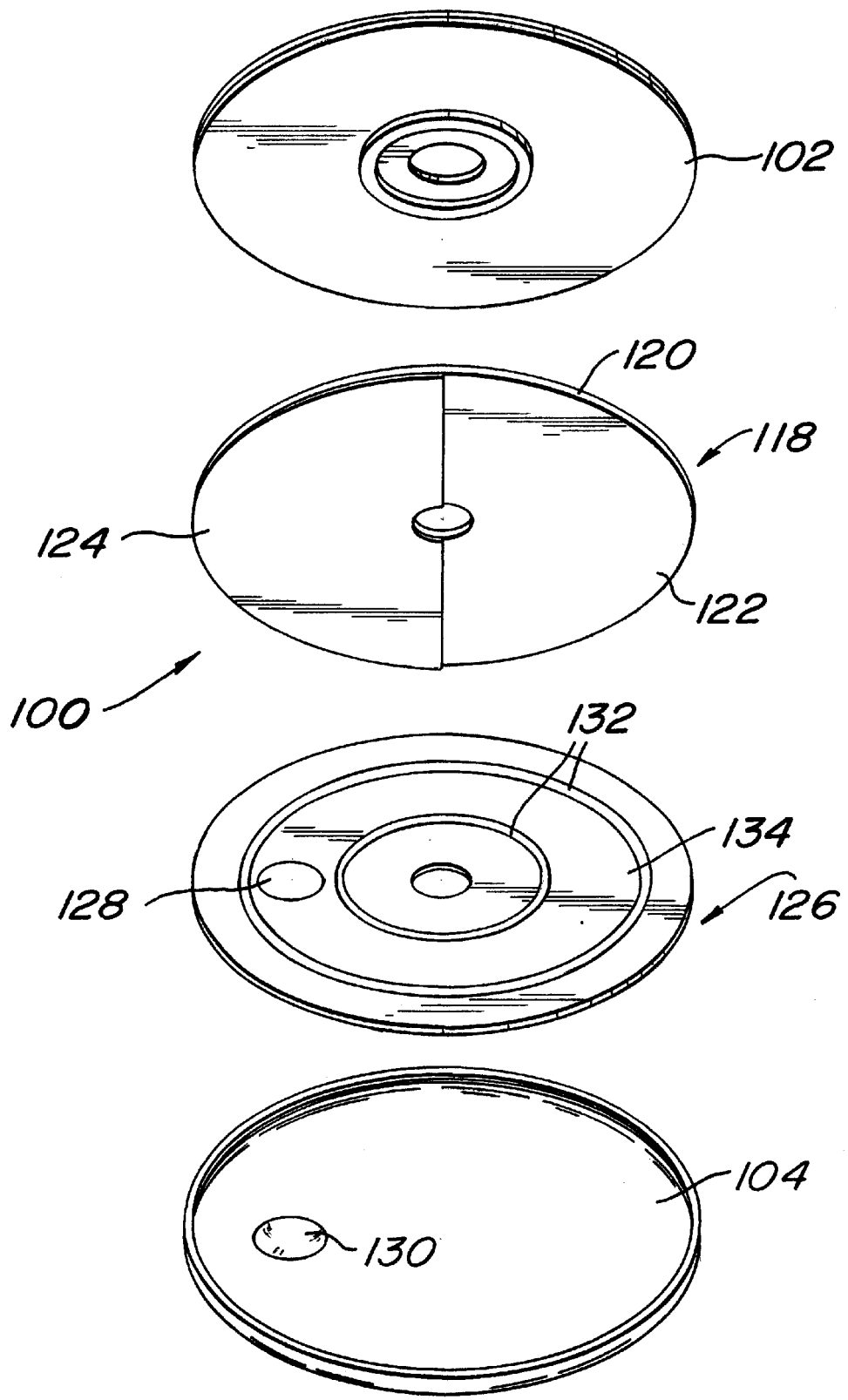
FIG. 11 is an exploded view of the optical storage medium stored in the unopened vacuum sealed case shown in FIG. 9.

As best seen in the exploded view of FIG. 11, case 100 contains a storage medium 118, such as for example a CD. Conventionally, CD 118 comprises a transparent substrate 120 and a thin reflective layer 122 on which are stored data to be read from the CD. As already noted, the reflective layer 122 is a thin sheet of reflective metallic material, such as aluminum. Usually, a layer 124 of barrier material is applied to the reflective layer 122, and covers the entire reflective layer 122. The barrier layer 124 is usually printed with indicia to identify the CD and its contents, and also serves to protect the reflective layer from exposure to external elements. In the present invention, a CD to be rendered unreadable after a preselected time is provided with a barrier layer 124 over only about half of the reflective layer 122, leaving the remaining portion of reflective layer 122 exposed.

A thin carrier layer 126, which carries a reservoir 128 of chemical agent, is placed over and adhered to the barrier layer 124 and reflective layer 122. The carrier layer is orientated so that the reservoir 128 lies over about the center of the barrier layer. If desired, body 104 of case 100 is provided with a recess 130 to receive reservoir 128 without subjecting reservoir 128 to mechanical pressure or deformation. At least one, and preferably two, beads 132 of adhesive are applied to the carrier layer 126 to attach it to CD 118. The beads 132 of adhesive also serve to define a channel 134 between them through which chemical agent released from reservoir 128 can flow onto reflective layer 122.

With this embodiment of the invention, the various parts are fabricated and assembled in a vacuum, such as inside a vacuum chamber. That is, the reservoir 128 is filled with chemical agent and the carrier layer 126 glued to CD 118 within the vacuum chamber. Then, CD 118, along with carrier layer 126 and reservoir 128, are placed into body 104 of case 100. Finally, lid 102 is snapped into place so that tongue 116 on lid 102 enters groove 114 on side wall 110 of body 104 to form an airtight seal. Since the CD 118 and attached carrier layer 126 are placed into case 100 in a vacuum environment, and since lid 102 is attached to body 104 in the same environment, the interior of case 100 will be under vacuum. The difference in pressure between the outside of case 100 (atmospheric pressure) and the inside of case 100 (vacuum) serves to hold lid firmly in place and prevent case 100 from being inadvertently opened.

FIG. 12 is a cross-sectional view of an assembled case 100 containing a CD 118 and attached carrier layer 126 and reservoir 128, showing the interrelationship of the parts. In the condition illustrated in FIG. 12, the reservoir 128 is stable, and chemical agent can be retained in the reservoir indefinitely. In that condition, the case 100 containing CD 118 can be shipped, stacked on shelves for storage, and otherwise handled without deleterious effect.

Once it is desired to use CD 118, however, case 100 must be opened to remove the CD. In order to open case 100, frangible seal 108 is broken, as indicated by the arrow in FIG. 13. Once seal 108 is broken, air at atmospheric pressure is admitted to the interior of case 100. This subjects reservoir 128 to atmospheric pressure, rupturing it and forcing the chemical agent contained in reservoir 128 to flow out of the reservoir and onto the surface of CD 118. Channel 134, defined by beads 132 of adhesive, constrains the chemical agent to flow circumferentially and thus onto the portion of reflective layer 122 unprotected by barrier layer 124. Once the chemical agent reaches the unprotected portion of reflective layer 122, it begins to interact with the reflective layer, as in the previously described embodiments, eventually rendering the reflective layer unreadable.

Breaking seal 108 and admitting air at atmospheric pressure into case 100 also makes it easy to remove lid 102 to permit removal of CD 118 from the case.

Turning now to FIGS. 14 and 15, there is shown yet another embodiment of the present invention. As in the previously described embodiments, the embodiment shown in FIGS. 14 and 15 comprises an optical storage medium, which may be any optical storage medium such as, for example, a DVD or CD. In the illustrated embodiment, the optical storage medium is in the form of a CD 118, which includes a substrate 120 having a center opening 106, a reflective layer 122, and a protective layer 124 overlying reflective layer 122. However, in this embodiment, protective layer 124 is provided with at least two openings 136 and 138 through it, to expose portions of reflective layer 122. In the region where protective layer 124 is provided with openings 126 and 138, protective layer is overlain with a thin metallic lamina, such as a metallic foil, 140. Lamina 140 is thin enough to be flexible, for the reasons given in more detail below. In addition, while a metallic foil is illustrated, a thin membrane of flexible polymer or other non-metal, coated with metal on the surface facing reflective layer 122, can be used without departing from the invention. In either case, the metal comprising lamina 140 is one that is electrochemically dissimilar to, and more electronegative than, the metal which comprises reflective layer 122. A typical, but not the only, suitable metal for lamina 140 is copper. Gold can also be used, for example, but is obviously more expensive than copper.

One of the openings, such as opening 138 in the illustrated embodiment, is filled with a chemical agent 142 having a preselected conductivity. An example of a suitable agent is a solution of sodium chloride (NaCl). The other of the openings, such as opening 136 in the illustrated embodiment, is not filled with a chemical agent. Rather, the opening is under vacuum, which can be achieved by assembling the optical storage medium in a vacuum environment, as already described in connection with the embodiment of FIGS. 9–13. Once assembled, the optical storage medium is placed inside a vacuum sealed case (not shown in FIG. 14–15), in the same manner as the embodiment of FIGS. 9–13.

After assembly and placement in the vacuum sealed case, the optical storage medium according to this embodiment will appear as illustrated in FIG. 14. As can be seen from that figure, lamina 140 is in contact with chemical agent 142, which fills opening 138, but is spaced apart from reflective layer 122 by protective layer 124 and is, therefore, not in contact with reflective layer 122.

Once the vacuum sealed case is opened, the optical storage medium is subjected to atmospheric pressure. The pressure of the atmosphere now surrounding the optical storage medium deforms lamina 140 inward into opening 136, which is under vacuum, and causes lamina 140 to contact reflective layer 122. This state is illustrated in FIG. 15, which shows the deformation of lamina 140 such that it contacts reflective layer 122. That action completes an electrical circuit from lamina 140 to reflective layer and then back to lamina 140 through the sodium chloride solution 142 in opening 138. Because reflective layer 122, typically aluminum, is less electronegative than the lamina 140, typically copper, an electrolytic current flows through the circuit. Electrons begin to flow from the aluminum to the copper and, as a consequence, the aluminum begins to break down because of voltaic action. When the aluminum has broken down to a sufficient degree, the reflective layer will no longer be readable, and the optical storage medium will have reached the end of its useful life.

The optical storage media of the present invention described above provides several advantages in the content media market. For example, the optical storage media of the present invention may be used as promotional material in point of sale purchases. When used as promotional material, the data stored in the optical storage media of the present invention may be used to offer on a trial basis software, music, movies, or other types of audio or visual data over a preselected period of time, such as a number of hours or days. At the expiration of the period of time, the optical storage media will have to be discarded and the consumer will have to purchase the data on a more permanent storage medium. In addition, the optical storage media may be used by hotels to offer movies, either free or at a price, that must be used within a specific period of time, such as in a day or in a couple of hours, after which it must be discarded.

As another example, the optical storage media of the present invention may be used in the movie rental industry. Often, movies in today's market are available to consumers as rental items in which the particular storage medium, such as a video cassette containing the movie, is rented for a fee. In exchange for paying the rental fee, the consumer is permitted to use the storage medium over a set period of time, such as three days, after which it has to be returned. At the end of three days, the video cassette is returned (if at all) and must be checked to ensure that it is rewound so that it may be rented again. However, by using the optical storage media of the present invention (such as an audio and/or visual DVD) as a rental item, the optical storage medium may be offered as a one-time purchase. As a one time purchase, the optical storage medium may be used for a preselected period of time, such as a couple of days, as desired. After the preselected period of time has expired, the optical storage media is discarded. In comparison to video cassettes, the content media distributor does not have to worry about the optical storage media being returned (if at all) and/or rewound. Rather, the content media distributor will simply have to maintain a supply of optical storage media to be purchased by the consumer. Thus, the costs associated with rental items such as movies may be reduced.

Furthermore, by utilizing optical storage media of the present invention, the content media distributor can have more control over the extent to which copies of the data are made. By limiting the availability of the data, the content media distributor may reduce the extent to which consumers will have the opportunity to make multiple copies of the data to avoid paying the cost to purchase the optical storage media. By reducing the risk of multiple copies, there is the potential to increase in the amount of optical storage media that is purchased. As a result, the increased purchases have the potential to generate revenue to the content media distributor or the author or inventor of the work or data.

The present invention has been described in reference to an optical storage medium such as the type shown in FIGS. 2, 5, and 6. However, it is contemplated that the optical storage medium can have any shape or size, such that the cylindrically shape of the optical storage medium 10 shown in FIGS. 1–8 is only exemplary. It is also contemplated that the optical storage medium may be replaced by other types of audio, visual, or computer software data storage devices on which data or information may be selectably stored and read. Furthermore, the application of incorporating a preselected chemical agent to render the storage device unreadable over a pre-selected period of time may be incorporated into other types of data storage devices known in the art.

Persons skilled in the art will recognize that there may be different devices, mechanisms, and methods of operation which are within the spirit and scope of the invention as defined in the claims. Also, it should be understood that the drawings, while useful in illustrating the invention, are not intended to be necessarily to scale. The dimensions and relative sizes and locations of the various parts shown can be varied, depending upon the particular optical storage media being used, without departing from the scope of the invention. To the extent that the drawings imply dimensions and relative size positions, the drawings should be regarding as illustrative only and not limiting the invention to particular dimensions, sizes, position, and location of parts.

Finally, the present invention may be embodied in other specific forms without departing from the spirit or essential attributes thereof and, accordingly, reference should be made to the appended claims, rather than to the foregoing specification, as indicating the scope of the invention.

What is claimed is:

1. An optical storage medium comprising a substrate supporting a data storage layer for storing optically readable data,
   reservoir attached to the substrate and located in proximity to the data storage layer for storing a chemical agent, the chemical agent being permitted to contact the data storage layer and interact therewith upon removal of the optical storage medium from a storage case prior to use.

2. An optical storage medium and container therefor, comprising
   a substrate supporting a data storage layer for storing optically readable data,
   a reservoir attached to the substrate for storing a chemical agent,
   a container having an interior in which the substrate and attached reservoir are housed,
   the reservoir being rupturable to release the chemical agent when subjected to an applied force in the course of the removal of the medium from the container, the reservoir being located in proximity to the data storage layer to permit chemical agent released from the reservoir upon rupture to contact select locations of the data storage layer.

3. An optical storage medium according to claim 2, wherein the chemical agent is one that reacts chemically with the data storage layer to render it unreadable after a preselected period of time.

4. An optical storage medium according to claim 2, wherein the applied force is a mechanical force.

5. An optical storage medium according to claim 4, further comprising a member removably attached to the medium and adjacent the reservoir such that removal of the member exerts the mechanical force on the reservoir.

6. An optical storage medium according to claim 2, wherein the applied force is created by subjecting the reservoir to atmospheric pressure.

7. An optical storage medium according to claim 6, further comprising
   a barrier layer partially covering the data storage layer,
   a carrier layer overlying the barrier layer and the data storage layer, the reservoir being attached to the substrate by the carrier layer by adhesive defining a channel through which chemical agent released from the reservoir flows to a portion of the data storage layer not covered by the barrier layer.

8. The optical storage medium as claimed in claim 3, wherein the chemical agent dissolves select portions of the reflective layer to render the optical storage medium unreadable.

9. An optical storage medium according to claim 2, wherein the data storage layer comprises a metallic material.

10. The optical storage medium as claimed in claim 9, wherein the metallic material is aluminum.

11. The optical storage medium as claimed in claim 9, wherein the reflective layer further comprises a segment of a metal having an electrochemical potential different from the electrochemical potential of the metallic material of the reflective layer.

12. The optical storage medium as claimed in claim 11, wherein the chemical agent facilitates an electrochemical reaction between the segment of metal and the metallic material of the reflective layer to dissolve a portion of the reflective layer, thereby rendering the optical storage medium unreadable.

13. An optical storage medium and container therefor, comprising
   a substrate supporting a data storage layer for storing optically readable data,
   a reservoir attached to the substrate for storing a chemical agent, the reservoir being rupturable to release the chemical agent when subjected to an applied force, the reservoir being located in proximity to the data storage layer to permit chemical agent released from the reservoir upon rupture to contact the data storage layer,
   a substantially airtight container having an interior in which the substrate and attached reservoir are housed, the interior of the container being under a vacuum, the container including a lid having an opening sealed by a frangible seal for admitting air under atmospheric pressure into the interior when the frangible seal is broken, the atmospheric pressure exerting a force on the reservoir sufficient to rupture the reservoir and release the chemical agent.

14. An optical storage medium according to claim 13, further comprising
   a barrier layer partially covering the data storage layer,
   a carrier layer overlying the barrier layer and the data storage layer, the reservoir being attached to the substrate by the carrier layer by adhesive defining a channel through which chemical agent released from the reservoir flows to a portion of the data storage layer not covered by the barrier layer.

15. An optical storage medium and container therefor, comprising a substrate supporting a data storage layer for storing optically readable data, a reservoir attached to the substrate for storing a chemical agent, the reservoir being rupturable to release the chemical agent when subjected to an applied force, the reservoir being located in proximity to the data storage layer to permit chemical agent released from the reservoir upon rupture to contact the data storage layer, a container having an interior in which the substrate and attached reservoir are housed, a removable retainer holding the storage medium in the container interior, the retainer including a member adjacent the reservoir such that removal of the retainer causes the member to exert a mechanical force on the reservoir sufficient to rupture the reservoir and release the chemical agent.

16. An optical storage medium and container therefor according to claim 15, wherein the retainer is rotatably attached to the case by a hub having a frangible portion that is breakable upon rotation of the retainer, the member being caused to exert the mechanical force on the reservoir upon rotation of the retainer.

17. An optical storage medium comprising a substrate supporting a metallic data storage layer for storing optically readable data, a reservoir located in proximity to the data storage layer for storing a chemical agent in contact with the data storage layer on a first side of the reservoir, a flexible metallic lamina in contact with the chemical agent on an opposite side of the reservoir, the lamina being more electronegative than the data storage layer, a nonconductive member intermediate the data storage layer and the lamina for holding apart the data storage layer and the lamina, the nonconductive member having at least a portion through which the lamina can be deformed and come into contact with the data storage layer to complete a voltaic circuit from the data storage layer through the chemical agent to the lamina.

18. An optical storage medium and container, comprising:

a substrate supporting a data storage layer storing optically readable data;

a chemical agent stored in proximity to the data storage layer; and an evacuated container containing within it the substrate and chemical agent;

the chemical agent being permitted to contact the data storage layer and interact therewith upon admission of air to the container.

19. The optical storage medium and container of claim 18, wherein the data cannot be read without removing the substrate from the container.

* * * * *